United States Patent [19]
Rocci et al.

[11] Patent Number: 4,810,898
[45] Date of Patent: Mar. 7, 1989

[54] RF NETWORK ISOLATION SWITCH

[75] Inventors: Joseph D. Rocci, Lansdale, Pa.; Michael L. Quelly, Asbury, N.J.

[73] Assignee: AM Communications, Inc., Quakertown, Pa.

[21] Appl. No.: 195,420

[22] Filed: May 13, 1988

Related U.S. Application Data

[63] Continuation of Ser. No. 74,784, Jul. 17, 1987, abandoned.

[51] Int. Cl.$^4$ ...................... H01H 19/14; H04H 1/00
[52] U.S. Cl. ........................................... 307/115; 455/4
[58] Field of Search ..................... 455/2, 4, 5; 307/115

[56] References Cited

U.S. PATENT DOCUMENTS

4,326,289  4/1982  Dickinson ............................. 455/2
4,450,481  5/1984  Dickinson ............................. 455/5

Primary Examiner—L. T. Hix
Assistant Examiner—David D. P. Porterfield
Attorney, Agent, or Firm—Ratner & Prestia

[57] ABSTRACT

An RF network has an RF isolation switch and an RF isolation switch control box coupled to each other by a single cable. The single cable coupling the isolation switch and the control box performs the dual functions of (1) applying power from the RF isolation switch to the control box and (2) applying control signals from the control box to the RF isolation switch. The control box may receive control information from a remote location and control the isolation switch in accordance with the received information. Additionally, a local manual switch is provided within the control box for local control of the isolation switch. Further in accordance with the invention, a method is provided for automatically determining at the headend of the network and at units distributed throughout the network that ingress is present and for systematically controlling RF isolation switches to locate the source of ingress.

16 Claims, 6 Drawing Sheets

RF NETWORK ISOLATION SWITCH

This application is a continuation, of application Ser. No. 074,784, filed 7/17/87 now abandoned.

BACKGROUND OF THE INVENTION

A. Field of the Invention

This invention relates to RF switch assemblies and in particular to control of RF switch assemblies.

B. Background Art

U.S. Pat. No. 4,326,289, "Expandable Communications Systems", filed Feb. 28, 1980 disclosed a broadband RF communication system having a central station, a plurality of subordinate stations that can be selectively addressed by the central station and a bidirectional transmission medium, for example a coaxial cable. The cable linked the subordinate stations of the system to the central station where a central controller was capable of addressing a specific subordinate station and exchanging control and message information with any address station.

Because the typical subordinate station was physically located on the premises of a customer, the station may have been vulnerable to unauthorized tampering. The possibility of tampering could be deterred by locating the system stations beyond the customer's premises. For example, the stations may have been located on utility poles or within cable vaults. However, in large computerized plants where communication was desired between many areas within the plant, these stations had to be distributed at many points where they were prone to tampering.

Additionally, in large networks there may be many miles of cable which are capable of picking up ingress signals. Ingress signals can include such things as noise and spurious signals which tend to be gathered by the numerous nodes of the system. In the case of an industrial RF network, ingress can cause communications outages which are very difficult to resolve.

It is desirable to detect ingress as soon as possible in order to try to resolve it before it causes an outage because down time in an industrial system may be extremely expensive. However spotting ingress in the prior art required visually observing it on a spectrum analyzer or the headend status monitor. Constant operator monitoring of these devices is tedious and unreliable.

In order to resolve outages caused by ingress or to prevent outages when ingress is first detected it is necessary to isolate the source of ingress in the network. A conventional method of ingress isolation was to systematically disconnect feeder cables throughout the system while an assistant at the headend observed whether the interfering signal was affected. The disconnecting of feeder cables was required in previous systems because these systems did not include local switches for locking out sections of the network.

In practice, this process required extensive walking around the plant floor with a ladder in order to access the feeder cables which were located substantially above head level to avoid damage. Two-way radio communication between the person disconnecting the feeder cables and the person at the headend was required throughout the process. This approach was very cumbersome and disruptive.

It is also known in the prior art to locate ingress using status monitors distributed in the network. These status monitors included RF switches having three modes which routed RF signals straight through the switch, attenuated the signals as they passed through the switch, or blocked the signals from passing through the switch thereby locking the signal out in accordance with control signals sent from the headend. Thus, an operator could observe the ingress at the headend and remotely operate selected status monitors to determine whether activation of each selected status monitor affected the ingress observed at the headend. The conventional method for selecting status monitors for remote operation of the associated RF switches to locate the source of the ingress was a bisection method. In the bisection method the network was divided in half. One half of the network was attenuated or locked out and the effect upon the observed ingress was determined. If the ingress disappeared then the half of the network which was attenuated or locked out included the source of the ingress and this portion of the network was bisected. This process was continued until the source of the ingress was located.

However in the prior art, the status monitors, including the associated three-mode RF switches, were only used in connection with amplifiers which could only be distributed in the system at a limited number of points because of the high cost. Thus the number of points in the network tree which could be switched from the headend while observing the affect on ingress at the headend was limited.

SUMMARY OF THE INVENTION

An RF network has an RF isolation switch and an RF isolation switch control box coupled to each other by a single cable. The single cable coupling the isolation switch and the control box performs the dual functions of (1) applying power from the RF isolation switch to the control box and (2) applying control signals from the control box to the RF isolation switch. The control box may receive control information from a remote location and control the isolation switch in accordance with the received information. Additionally, a local manual switch is provided within the control box for local control of the isolation switch.

GENERAL DESCRIPTION OF THE INVENTION

Figure 1:
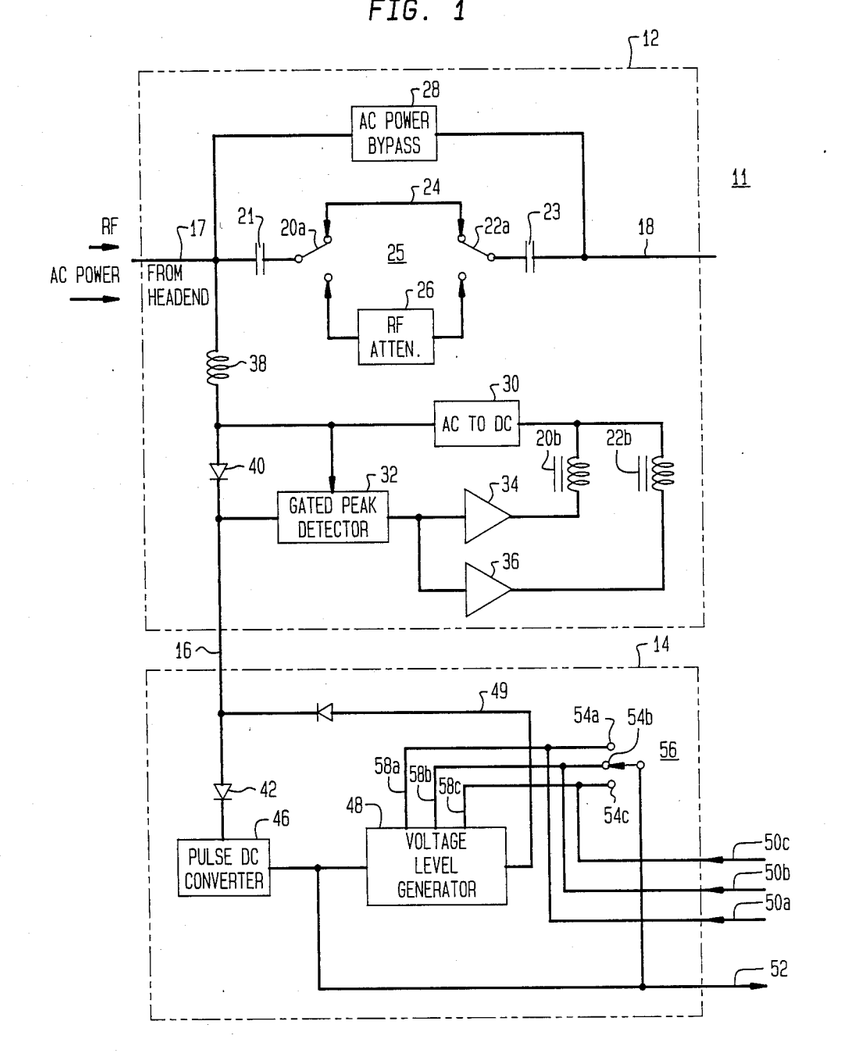
FIG. 1 shows a block diagram of the RF relay assembly and the control box of the present invention as well as a single control line therebetween.

Referring now to FIG. 1, there is shown network isolation switch 11 of the present invention which receives RF signals and AC power by way of cable 17. Switch 11 includes RF relay assembly 12 as well as local control box 14 for local control of the operation of RF relay assembly 12. Drop cable 16, comprising a single line, performs the dual functions of (1) applying power from RF relay assembly 12 to control box 14 and (2) applying control signals from control box 14 to RF relay assembly 12.

An inbound RF signal may also be received by assembly 12 by way of cable 18. In its normal mode of operation, all inbound and outbound RF signals are routed directly through RF relay assembly 12 by way of contact 24 of RF switch 25. Thus relay assembly 12 in its normal mode applies the outbound RF signal received by way of cable 17, as well as the AC power, to cable 18. RF relay assembly 12 also routes the inbound RF signal received by way of cable 18 to cable 17 in its normal mode. The switching/attenuation functions required for control of an RF network are thus provided in a self-contained assembly 12 which is powered from system AC and controlled from a locally mounted control box 14.

Selection of Modes of Relay Assembly 12

As well as routing signals directly through relay assembly 12, RF switch 25 of relay assembly 12, under the control of control box 14, may attenuate RF signals passing between cables 17,18 using RF attenuator 26. RF switch 25 of relay assembly 12 may also lock out RF signals on cable 17,18 by acting as an open RF circuit.

Thus, RF relay assembly 12 may operate in three modes. Three position switch 56 within control box 14, which is local to assembly 12, may select one of the three modes of assembly 12 by applying to cable 16 one of three different voltage levels provided by voltage level generator 48. The voltage level applied to cable 16 is transmitted to assembly 12 by the single line of cable 16.

In assembly 12 the transmitted level from voltage level generator 48 of control box 14 is compared with set points by comparators 34,36 to determine which of the three modes of assembly 12 is selected. Relays 20b, 22b are then operated in accordance with the level determination of comparators 34,36 to open and close relay controlled switches 20a, 22a of RF switch 25 thus determining whether RF signals are routed directly through, attenuated, or locked out.

Powder Supply to Control Box 14

AC power received by way of cable 17 is rectified by diode 40 and transmitted as pulsed DC from RF relay assembly 12 to control box 14 by way of cable 16. Converter 46 receives the pulsed DC voltage of cable 16 and stores electrical energy received during the positive half-cycle of the received AC power waveform in a capacitor (not shown). During the negative half cycle of the received AC power waveform, the capacitor of converter 43 discharges and provides DC voltage to operate the electronics of control box 14, including the DC voltage to operate voltage level generator 48.

The voltage provided by level generator 48 is used by level generator 48 to provide the voltage level control signal which is applied to RF relay assembly 12 by way of cable 16. Thus cable 16 applies power to control box 14 and also applies control signals from control box 14 to RF relay assembly 12.

RF Switch 11 Within RF System 100

Figure 2:
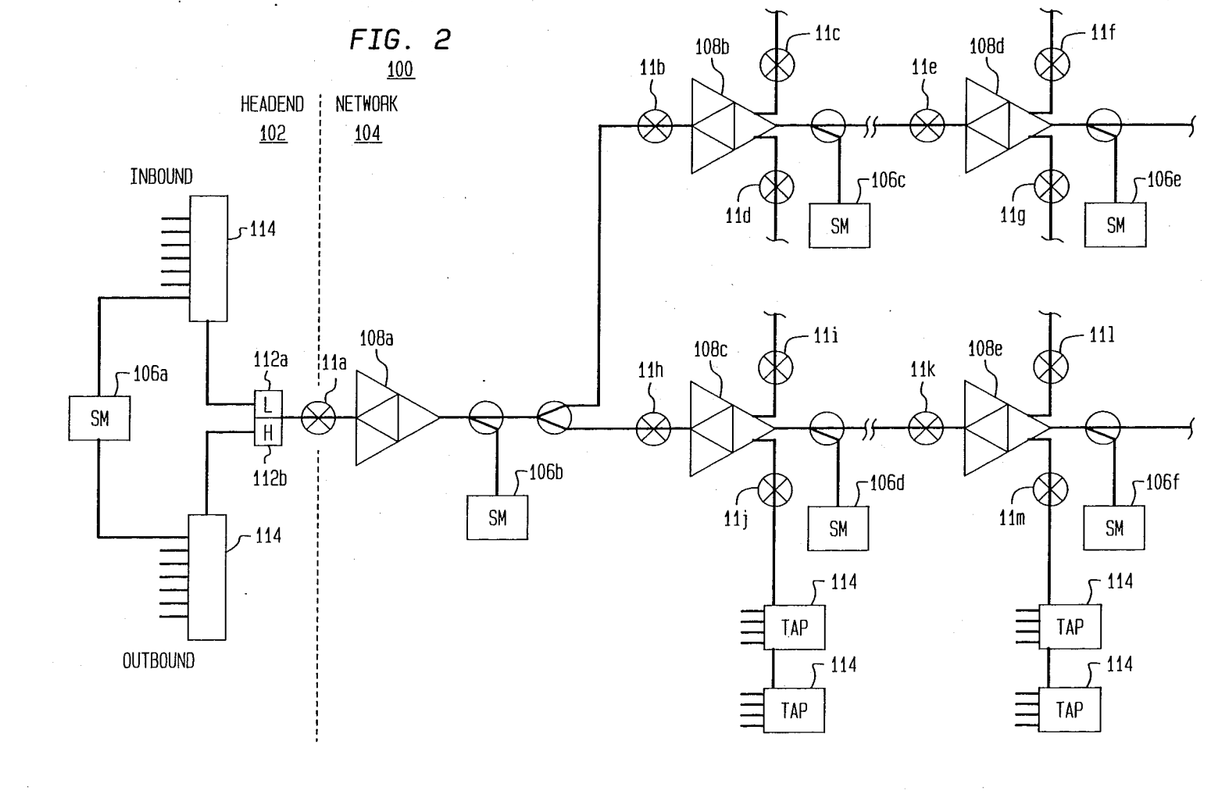
FIG. 2 shows a plurality of the assemblies of FIG. 1 arranged in a network tree.

Referring now to FIG. 2, there is shown network ingress isolation system 100. System 100 is a broadband RF system including headend 102 and network 104. A plurality of communications devices (not shown) distributed throughout the tree structure of network 104 may communicate with headend 102 within system 100. System 100 includes a plurality of network isolation switches 11a-m identical to network isolation switch 11 of FIG. 1. Inbound ingress within system 100 may be detected at status monitor 106a of headend 102. This ingress may originate anywhere within the tree structure of network 104 or within headend 102 itself. By remotely controlling network isolation switches 11a-m and systematically actuating selected ones of switches 11a-m, system 100 may locate the source of the inbound ingress.

Because switches 11a-m are small and inexpensive, they maybe spliced in at a large number of points in RF system 100. Control box 14 may be mounted at floor level to permit easy access. Switch 56 of control box 14 may be a keyswitch to limit operation to authorized operators.

Operation of Relay Assembly 12

The RF signals of system 11 (FIG. 1) are coupled by way of capacitor 21 to relay controlled normally closed switch 20a. In its normally closed position, relay controlled switch 20a applies the outbound RF signal received by way of cable 17 to contact 24. The outbound RF signal applied to contact 24 is coupled to capacitor 23, and therefrom to output cable 18, by relay controlled normally closed switch 22a when relay controlled switch 22a is in its normally closed position Likewise, when both relay controlled switches 20a,22a are closed, an inbound RF signal applied to RF relay assembly 12 by way of cable 18 is routed from cable 18 to cable 17 by way of contact 24 of RF switch 25.

When both relay controlled switches 20a,22a are open, the outbound RF signal received by way of cable 17 is applied to cable 18 by way of RF attenuator 26 and the inbound RF signal received by way of cable 18 is applied to cable 17 by way of RF attenuator 26. Thus when both relay controlled switches 20a,20b are closed the RF signals are routed straight through and when both are open, the RF signals are attenuated.

RF attenuator 26 may attenuate the RF signals by 6 db in a conventional manner. Additionally, RF attenuator 26 may selectively attenuate the inbound RF signal, also in a conventional manner.

If relay controlled switch 20a is open while relay controlled switch 22a is closed, or if switch 20a is closed while switch 22a is open, the outbound RF signal received by way of cable 17 is not applied to cable 18 by RF relay assembly 12 and the outbound RF signal is thereby locked out and is not transmitted through relay assembly 12. Likewise, under these conditions, the inbound RF signal received by way of cable 18 is locked out.

AC Power Supply

As previously described, AC power is also applied to relay assembly 12 by way of cable 17. AC power from cable 17 is continuously applied to cable 18 by way of AC power bypass 28 which continuously bypasses switches 20a,22a regardless of the state of relay controlled switches 20a,22a of switch 25.

It will be understood by those skilled in the art that because of losses within network 104, AC power may not be provided to all network isolation switches 11a-m by a single AC power supply (not shown) and that in-large networks 104 numerous AC power supplies (not shown) may be required. Additionally, although the source of AC power is shown on the headend side (cable 17) of RF relay assembly 12, some relay assemblies 12 within the system may receive AC power from the opposite side (cable 18). Thus AC power may be supplied to individual network isolation switches 11a–m from either direction and AC power bypass 28 within each isolation switch 11a–m is bidirectional.

The AC power received by way of cable 17 is rectified by diode 40 and applied as pulsed DC by way of drop cable 16 to control box 14. Thus diode 40 permits the positive half cycles of the received AC voltage waveform to be applied by cable 16 to control box 14 as pulses. Control box 14 uses the power received during the positive half cycles to operate the internal electronics of control box 14 and to provide control signals to relay assembly 12 during the negative half-cycles.

The positive half-cycles received by control box 14 are thus applied as a pulsed DC signal which is stored in a capacitor (not shown) within converter 46 during the positive half-cycles of the received AC waveform and applied to voltage level generator 48 by converter 46 when the capacitor discharges. Voltage level generator 48 may be a conventional voltage divider circuit (not shown) for providing three different voltage levels. The voltage levels selected by switch 56 at terminals 54a,b,c is applied to cable 16 by way of output line 49 of voltage level generator 48. In an alternate embodiment (not shown) voltage level generator 48 may include a zener diode (not shown). Thus three voltage levels, including zero volts, may be provided by level generator 48. The voltage levels selected at terminals 58a,b,c thus select the state of RF switch 25 of RF assembly 12.

Automatic Ingress Detection

The first part of ingress detection is the identification of a signal as ingress. This process may be performed either manually or automatically. The manual method of detecting inbound ingress consists of observing the received headend signals on a spectrum analyzer (not shown) at headend 102. From this observation an operator may determine that ingress is present and identify which signal is ingress.

The automatic method of locating outbound ingress can be performed as follows Periodically a spectral picture of the system is taken at each status monitor 106b–e within network 104. To create a spectral picture for each status monitor 106b–e, each status monitor 106b–e is stepped across the system bandwidth in fifty to three hundred kilohertz steps when there is no ingress. At each step the level of any signal present is recorded. Several such readings may be averaged to eliminate errors due to switched carriers and other spectral variations. These levels are stored on disk in a system controller at headend 102 for later reference as a baseline.

In the same manner, new pictures of the spectrum of system 100 are periodically created during actual operation of system 100. When a new picture is created it may be compared to the previous picture recorded for that location This comparison may be performed automatically. Differences in the two pictures are noted. Any signals above a preset level that appear in the new picture that did not appear in the old picture are potential ingress signals. The allowable level and frequency variation from the baseline before a signal is interpreted may be programmed. The occurrence of any potential ingress signal triggers an alarm and alerts the operator and automatic localizing of the ingress may proceed.

To detect inbound ingress automatically, a spectral picture of the headend signal is stored on disk when there is no ingress as described for the spectral pictures for detecting outbound ingress. Periodically spectral pictures of the headend signal during actual operation are produced and compared with the spectral picture on disk from the no-ingress condition. Discrepancies reveal not only the presence of ingress but also the frequency of the ingress signal. Thus, the method of automatically detecting outbound ingress is essentially the same as the method of detecting inbound ingress except that it is performed by status monitors 106b–e within network 104 rather than by status monitor 106a within headend 102.

In summary, the method of developing spectral pictures for later comparison to detect ingress is essentially the same for the picture at status monitor 106a at headend 102 and for status monitors 106b–e. distributed throughout network 104; tuning a frequency agile status monitor to a plurality of frequencies across the spectrum and measuring the signal at each step.

Status monitors 106a–e may each be under the control of an individual Network Technologies TMC 8000. The control system portion of status monitor 106a orchestrates all status monitors 106a–e in system 100.

Status monitors 106a–e must be addressable as well as tunable or frequency agile. Such devices are disclosed in copending U.S. patent Ser. No. 813,601, of which this application is a Continuation-in-Part, U.S. Pat. No. 4,450,481, issued May 22, 1984 to Dickinson and U.S. Pat. No. 4,326,289 issued Apr. 20, 1982 to Dickinson, which are incorporated herein by reference.

The Network Technologies TMC-8000 and their use as status monitors is disclosed in Performance Specifications, Technical Monitor and Control System Model TML-8000, Draft 2.4, Oct. 13, 1986, Publication #A430-0058-00 and Status Monitoring for Broadband Local Area Networks in the Factory, Revision A, May 7, 1986 by Roger W. Stevens and Michael L. Quelly which are incorporated herein by reference.

Additional status monitors, similar to status monitors 106a–e, may be added to system 100 by coupling them to switches 11a–m to provide further checkpoints for detecting ingress and to permit monitoring and override capability for keyswitches 56 within control boxes 14 of switches 11a–m. Additionally, system AC power may be monitored by each status monitor 106a–e as well as any additional status monitors added onto switches 11a–m. Added on status monitors as well as status monitors 106a–e, may be Network Technologies TMC 8000.

Inbound RF signals are applied to status monitor 106a by way of low band filter 112a and outband RF signals are applied to network 104 by way of high band filter 112b. Low band filter 112a and high band filter 112b form a conventional duplexing filter. Taps 114 are also conventional.

Automatic Ingress Localizing—General

Network isolation switches 11a–m, each including an individual RF attenuator 26, and status monitors 106a–e are located in the branches of the tree structure of system 100. Bidirectional amplifiers 108a–e define the nodes of network 104. For example, bidirectional amplifiers 108b defines a node having three branches: a branch containing switch 11c, a branch containing switch 11d, and a branch containing switch 11e. The nodes defined by bidirectional amplifiers 108a–e may be referred to as nodes 108a–e respectively for convenience.

During execution of an ingress isolation algorithm, the current position always moves from one isolation switch 11a-m to another isolation switch 11a-m. If in moving from one switch 11a-m to the next a node is encountered that is the end point for more than two branches, a current position is defined as being at a split. Ingress sources are always between isolation switches 11a-m.

Automatic Ingress Localizing - Inbound

The inbound isolation process always starts at headend 102 and works outbound To begin the process of locating inbound ingress, status monitor 106a at headend 102 is tuned to the frequency of the ingress signal to be located. During the execution of the algorithm status monitor 106a makes level measurements to determine the effect of actuating remotely controlled attenuators 26 within switches 11a-m in accordance with the algorithm.

Figure 3:
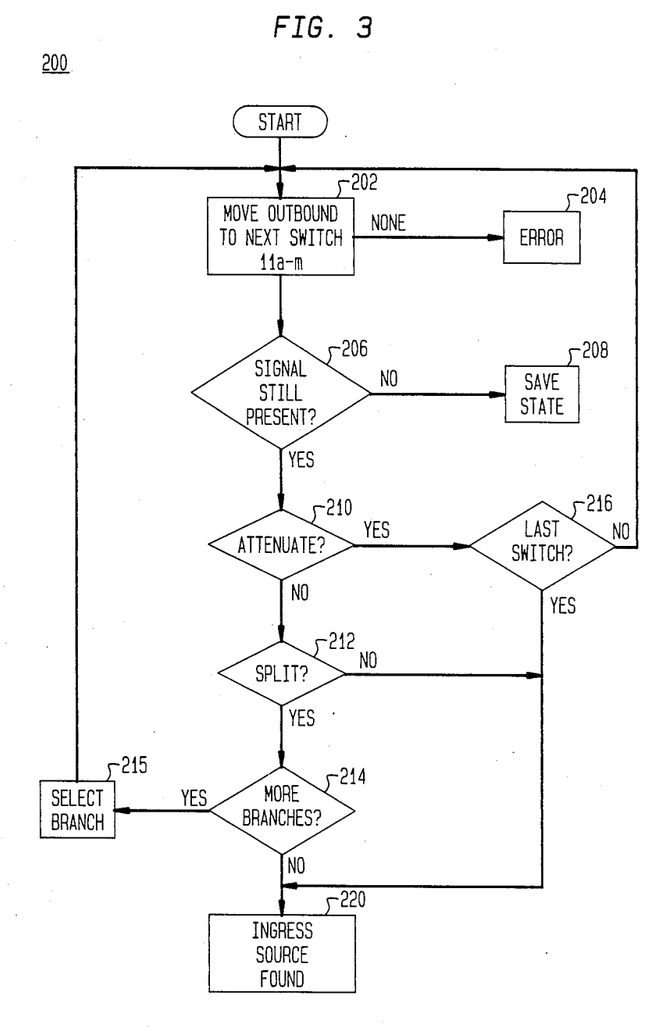
FIG. 3 is a representation of a routine for localizing inbound ingress.

Referring now to FIG. 3, there is shown inbound ingress isolation routine 200. The first step in routine 200 is to move to the next outbound switch 11a-m as shown in block 202. If the tree splits the first branch of the split is selected. When routine 200 is executed the first time execution proceeds to switch 11a. If no more outbound switches 11a-m are found when executing block 202, there is an error and execution proceeds to error routine 204.

A determination is then made at decision 206 whether the signal to be located is still present at headend 102. This determination is made by status monitor 106a. If the signal to be located is no longer present then the current position is saved as shown in block 208 so that the process can be continued at this point when the signal returns. Thus system 100 may locate intermittent ingress. If the signal is still present, as determined at decision 206, execution proceeds to decision 210 where a determination is made whether actuating attenuator 26 of the next outbound switch 11a-m attenuates the signal observed at status monitor 106a within headend 102.

If actuation of attenuator 26 at the current position does not attenuate the ingress signal observed at headend 102, execution proceeds to decision 212 where a determination is made whether the current position is at a split in the tree. If there is a split between the current switch 11a-m and next switch 11a-m, a determination is made at decision 214 of whether there is more than one branch If there is not more than one branch remaining as determined in decision 214, the source of the ingress is in the one remaining branch and has thereby been localized as shown in block 220. If there is more than one branch remaining, one of the remaining branches is selected as shown in block 215.

If the current location is not at a split in the tree, as determined in decision 212, the source of ingress is between the current switch 11a-m and the next inbound switch 11a-m. Thus the source of ingress is found and execution proceeds to block 220. If actuation of attenuator 26 of current switch 11a-m does attenuate the signal observed at headend 102, as determined in decision 210, a determination is made at decision 216 whether current switch 11a-m is the last switch 11a-m in the branch. If the current switch 11a-m is the last switch 11a-m as determined in decision 216, the source of ingress is between the current switch 11a-m and the end of the leg. Thus the source of ingress is found and execution proceeds to block 220. If the current switch 11a-m is not the last switch in the leg, execution proceeds to block 202 where the next switch 11a-m becomes the current switch 11a-m.

Automatic Ingress Localizing - Outbound

Figure 4:
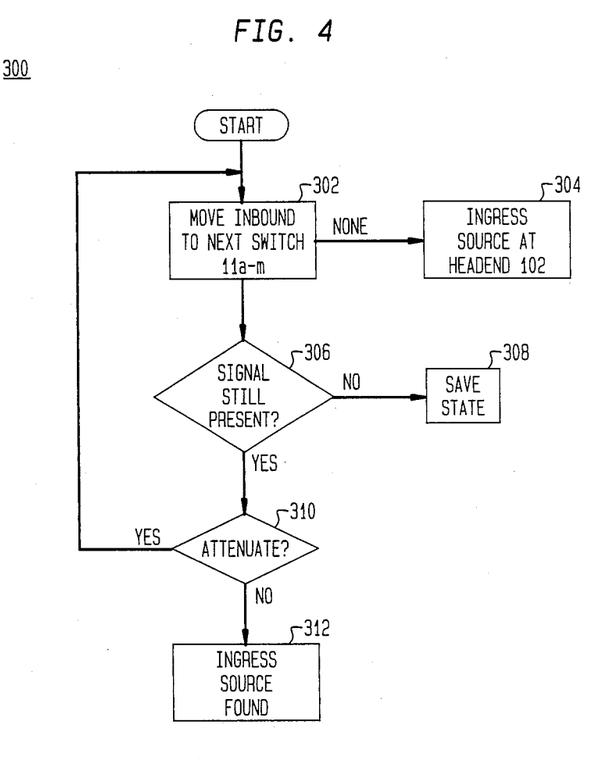
FIG. 4 is a representation of a routine for localizing outband ingress.

Referring now to FIG. 4, there is shown outbound ingress localizing routine 300. Routine 300 is used to locate the source of an ingress signal detected by a status monitor 106b-e within network 104 of system 100. Prior to beginning the execution of routine 300 the status monitor 106b-e which located the ingress signal is tuned to the frequency of the signal to be located. Execution then begins at the status monitor 106b-e at which the signal to be located was detected and which location has been tuned to the frequency of the signal to be located. Execution then proceeds to the next inbound switch 11a-m as shown in block 302.

If there are no more inbound switches the source of ingress is headend 102 as shown in block 304. If there are additional inbound switches 11a-m a determination is made at decision 306 whether the ingress signal is still present. This decision is made by the status monitor 106b-e which detected the ingress. If the ingress signal is no longer present, the current position is saved so that the process can be continued at the current position when this signal reappears as shown in block 308. If the signal is still present, as determined at decision 306, attenuator 26 of the current switch 11a-m is actuated and a determination is made at decision 310 whether actuation of attenuator 26 attenuates the signal observed at the status monitor 106b-e which detected the ingress.

If actuation of the switch attenuates the signal then the current position is still between the source of the ingress and the status monitor 106b-e which located the ingress. Execution therefore proceeds to block 302 and the next inbound switch 11a-m is located as previously described.

If actuation of current switch 11a-m does not attenuate the signal, as determined in decision 310, the source of ingress is located between the current switch 11a-m and the previous switch as shown in block 312.

Control Box 14

Figure 5:
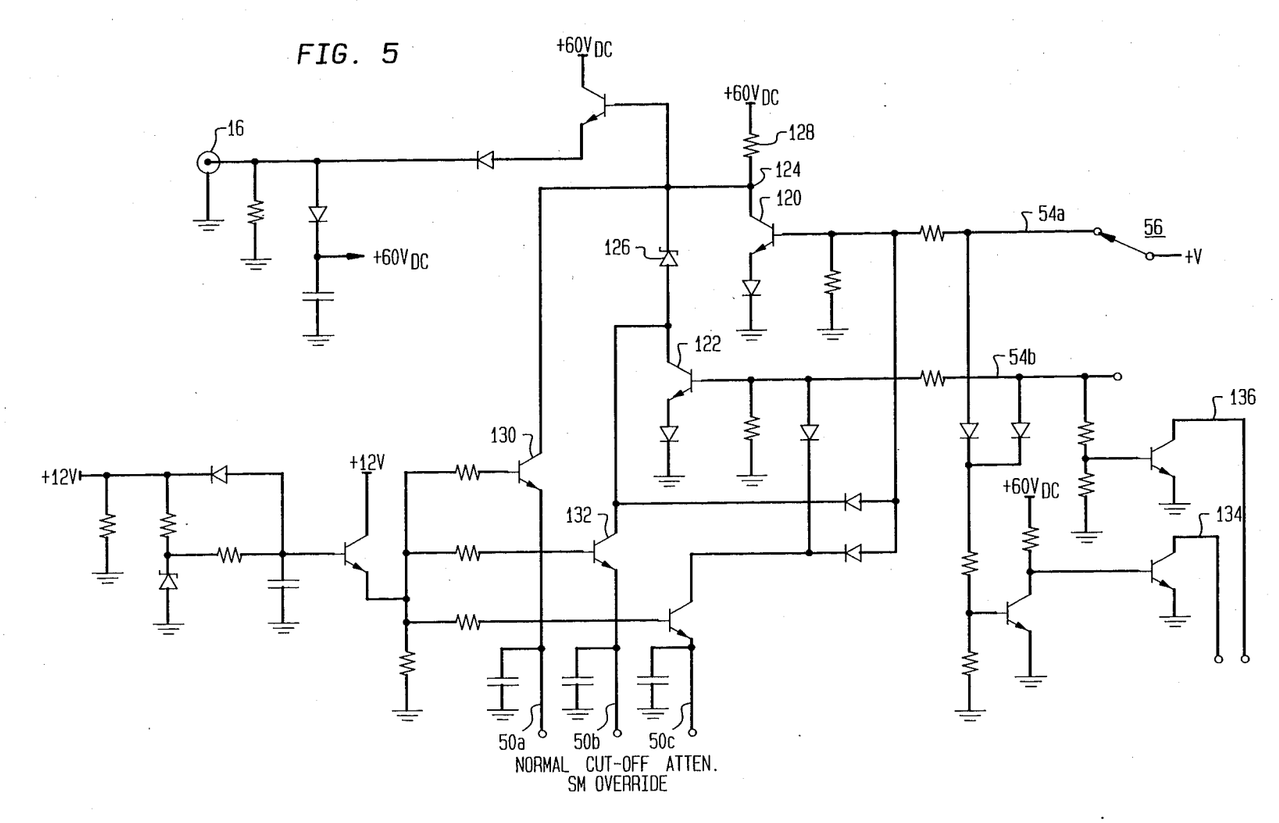
FIG. 5 is a more detailed representation of the control box of FIG. 1.

Referring now to FIG. 5 there is shown a more detailed representation of control box 14. As previously described switch 56 of control box 14 causes one of three differing voltage levels to be applied to cable 16 for selecting one of the three modes of RF switch 25 of RF switch assembly 12. If the contact of switch 56 applies a voltage level to terminal 54a transistor 120 is turned on and circuit node 124 is pulled substantially to ground Transistor 120, as well as the other transistors of control box 14, may be a MPSA42. In practice node 124 may be at approximately two volts because of the semiconductor junction drops between node 124 and ground.

If the contact of switch 56 applies a voltage to terminal 54b, transistor 122 is turned on pulling the anode of zener diode 126 substantially to ground and causing zener diode 126 to hold its zener voltage. Zener diode 126 may be a twenty-five volt zener diode causing circuit node 124 to have a voltage approximately equal to twenty-seven volts. If the contact of switch 56 applies a voltage level to neither terminal 54a nor terminal 54b then neither transistor 120 nor transistor 122 is turned on and circuit node 124 is pulled up to approximately 60 volts by way of pull up resistor 128.

As previously described, control box 14 may be coupled to a computer system such as the Network Technologies TMC 8000 to provide the status monitor function such as that provided by status monitors 106b-e of network 104. These functions include both a remote override of switch 56 as well as a remote monitoring of the state of control box 14. The remote override connections of control box 14 are provided at terminals 50a,b,c. Thus, for example, to pull circuit node 124 to ground regardless of the position of switch 56 terminal 50a may be pulled to ground turning on transistor 130. Likewise to pull the anode of zener diode 126 to ground terminal 50b may be pulled to ground turning on transistor 132. When terminal 50c is pulled to ground, the bases of transistor 120 and transistor 122 are pulled to ground causing both transistor 120 and transistor 122 to turn off and allowing the voltage of circuit node 124 to be pulled up to substantially 60 volts by way of pull up resistor 128.

The state of control box 14 may be monitored from a remote location by way of the Network Technologies TMC 8000 coupled to control box 14 at terminals 134, 136.

Figure 6:
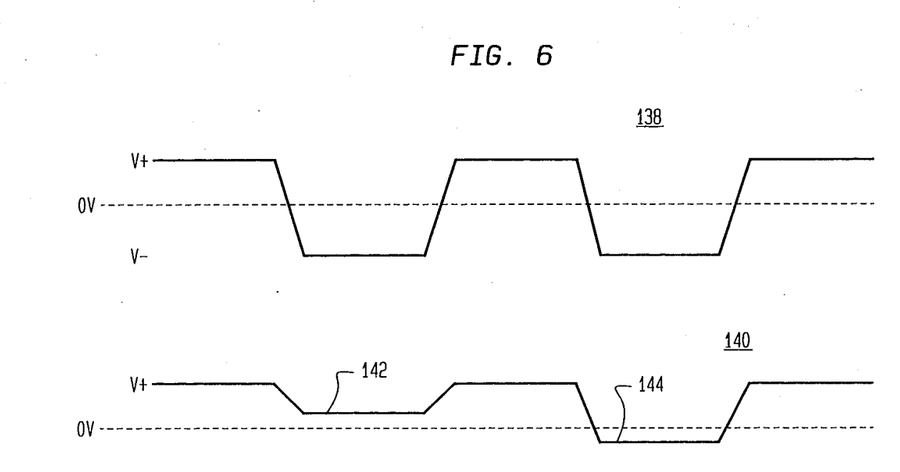
FIG. 6 shows the waveforms of the single cable of FIG. 1.

Referring now to FIG. 6, there are shown waveforms 138,140 carried by cable 16 to provide AC power from RF switch assembly 12 to control box 14 and to provide control of RF assembly 12. Waveform 138 is the AC input power waveform provided to control box 14 by way of cable 16 from RF relay assembly 12. As previously described, power is provided to control box 14 only during the positive half cycles of the AC power provided by cable 17 to RF relay assembly 12 because of diode 40. Also as previously described waveform 138 may be floating with respect to ground.

Waveform 140 shows the control waveform provided by control box 14 by way of cable 16 to RF relay assembly 12. When switch 56 applies voltage to terminal 54a pulling circuit node 124 substantially to ground, waveform 142 is provided by control box 14 to cable 16. When switch 56 applies a voltage level to terminal 54b turning on to transistor 122 and thereby turning on zener diode 127 voltage waveform 144 is applied in a similar manner to cable 16. When neither terminal 54a nor terminal 54b has a voltage applied to it a voltage level is applied to cable 16 which is substantially equal to the peak level of waveform 140.

Gated peak detector 32 of RF relay assembly 12 applies the voltage levels applied to cable 16 by control box 14 for comparison by comparators 34, 36. Comparators 34,36 control relays 20b, 22b in accordance with these voltage levels and thereby control switches 20a, 22b of switch 25.

We claim:
1. In an RF system having lines of system power and RF signals, a plurality of RF isolation switching means, each RF switching isolation means having a control system and relay means having a plurality of modes for switching said RF signals, comprising:
said control system including control switch means having a plurality of control switch positions;
a single coupling line for coupling said control system to said relay means;
said relay means including means for receiving said system power from said system power line and applying said system power to said control system by way of said single coupling line for energizing said control system;
said control system including means for providing differing control voltage levels in accordance with said control switch positions, each control voltage level corresponding to one of said relay modes;
means for applying said control voltage levels to said single coupling line; and
said relay means including means for receiving said applied control voltage levels from said coupling line and selecting one of said relay modes in accordance with said applied control voltage levels whereby said single coupling line carries both said system power and said control voltage levels.

2. The switching isolation means of claim 1 further comprising remote monitoring means for determining said switch position from a location remote from said control system.

3. The switching isolation means of claim 1 wherein said system power is AC further comprising means for converting AC to DC coupled to said power receiving means whereby said control levels are DC.

4. The switching isolation means of claim 1 further comprising means for remotely determining whether said control system is receiving said system power.

5. The switching isolation means of claim 1 wherein said plurality of modes includes an attenuating mode, a lockout mode, and a normal mode wherein signals may pass through said relay assembly substantially unaltered.

6. In an RF network having lines of system power and RF signals, RF switching isolation means having relay means for switching said RF signals, comprising:
first means selectable for attenuating said RF signals passing through said switching isolation means;
second means selectable for locking out said RF signals passing through said switching isolation means;
third means selectable for directly routing said RF signals through said switching isolation means substantially unaltered; and
a control system including switch means having switch positions for selecting one of said first, second or third means and in which said switch means is adjacent and local to said first, second and third means and free of coupling through the lines of system power and RF signals.

7. The switching isolation means of claim 6 wherein said switch means is free of coupling to said first, second and third means through said lines of system power and RF signals.

8. The switching isolation means of claim 6 further comprising a single coupling line coupled to said relay means and to said control system.

9. The switching isolation means of claim 8 wherein said control system further includes means for providing different voltage control levels in accordance with said switch positions of said local switch means, each control voltage level corresponding to one of said selected means, and means for applying said control voltage levels to said single coupling line.

10. The switching isolation means of claim 9 wherein said relay means includes means for receiving system power and applying system power to said control system by way of said single coupling line and means for receiving said applied voltage levels from said single coupling line and selecting a relay mode in accordance with said applied voltage level whereby said single output line carries both said system power and said control voltage levels.

11. In an RF network having a headend and a tree structure including a plurality of amplifiers and paths, a system for localizing a source of ingress into the network, comprising:

means for determining an ingress signal at said headend;

units distributed through said network independently of said amplifiers, each unit having means operable for attenuating a network path of said tree structure;

means for actuating said attenuating means local to each of said distributed units; and means for determining whether said ingress is reduced after actuating each attenuating means.

12. The system of claim 11 wherein said actuating means is free of coupling to said distributed unites through said lines of system power and RF signals.

13. In an RF network having an inbound direction and an outbound direction, a method for automatically localizing a source of inbound ingress, said RF network having a plurality of amplifiers, a headend, a plurality of network nodes and branches forming a network tree, and a plurality of switches, each switch having an associated attenuator, comprising the steps of:

(a) detecting the presence of an ingress signal at said headend;

(b) identifying the next switch in said outbound direction independently of the location of said amplifiers and designating said next switch as the current switch; and (c) actuating the attenuator of said current switch, first determining whether said detected ingress signal is attentuated.

14. The method of claim 13 further comprising the steps of:

(d) second determining whether said current switch is the last switch of a branch if said first determination is affirmative;

(e) repeating steps (b)–(d) if said second determination is negative and otherwise determining that said source of ingress is between said current switch and the end of said branch; and (f) if said first determination is negative, third determining whether branching is present between said current switch and the next switch in the inbound direction.

15. The method of claim 14 further comprising the steps of:

(g) determining that said source of ingress is between said current switch and said next switch in the inbound direction if said third determination is negative;

(h) if said third determination is affirmative, fourth determining whether said node has any further branches; and (i) if said fourth determination is affirmative, determining that said source of ingress is in one of said further branches.

16. In an RF network having an inbound direction and an outbound direction, a method for localizing a source of outbound ingress, said RF network having a plurality of amplifiers and a plurality of switches each switch having an associated attenuator, comprising the steps of:

(a) detecting the presence of ingress at one of said switches;

(b) identifying the next switch in said inbound direction independently of the location of said amplifiers, and designating said next switch as the current switch;

(c) actuating the attenuator of said current switch;

(d) determining whether said detected ingress signal is attenuated;

(e) if said determination is affirmative, repeating steps (b)–(d); and, (f) if said determination is negative, determining that said source of ingress is between said current switch and the next switch in said outbound direction.

* * * * *